E. T. BATES.
COMPOSITE CONSTRUCTION OF WALLS, PARTITIONS, AND THE LIKE.
APPLICATION FILED APR. 6, 1910.
1,052,788.
Patented Feb. 11, 1913.
3 SHEETS—SHEET 3.
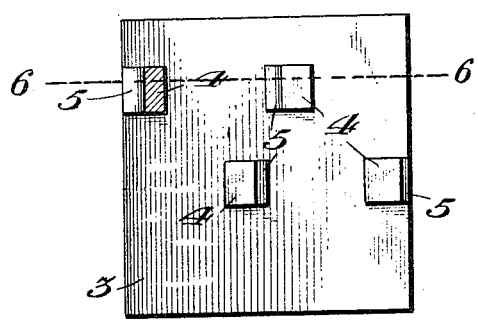
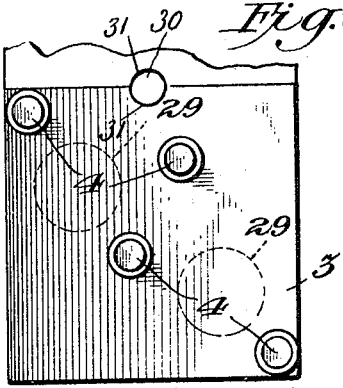
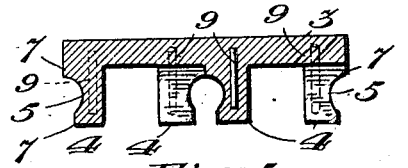
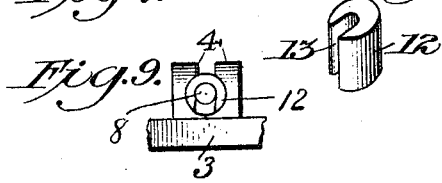
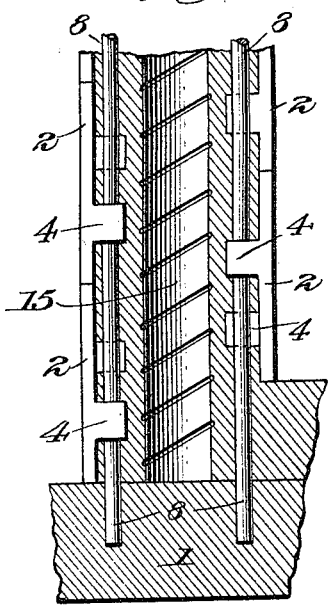
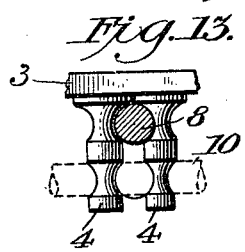
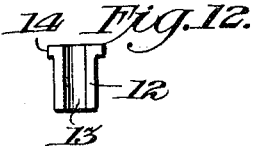
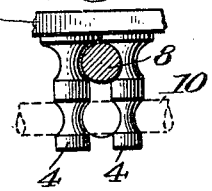

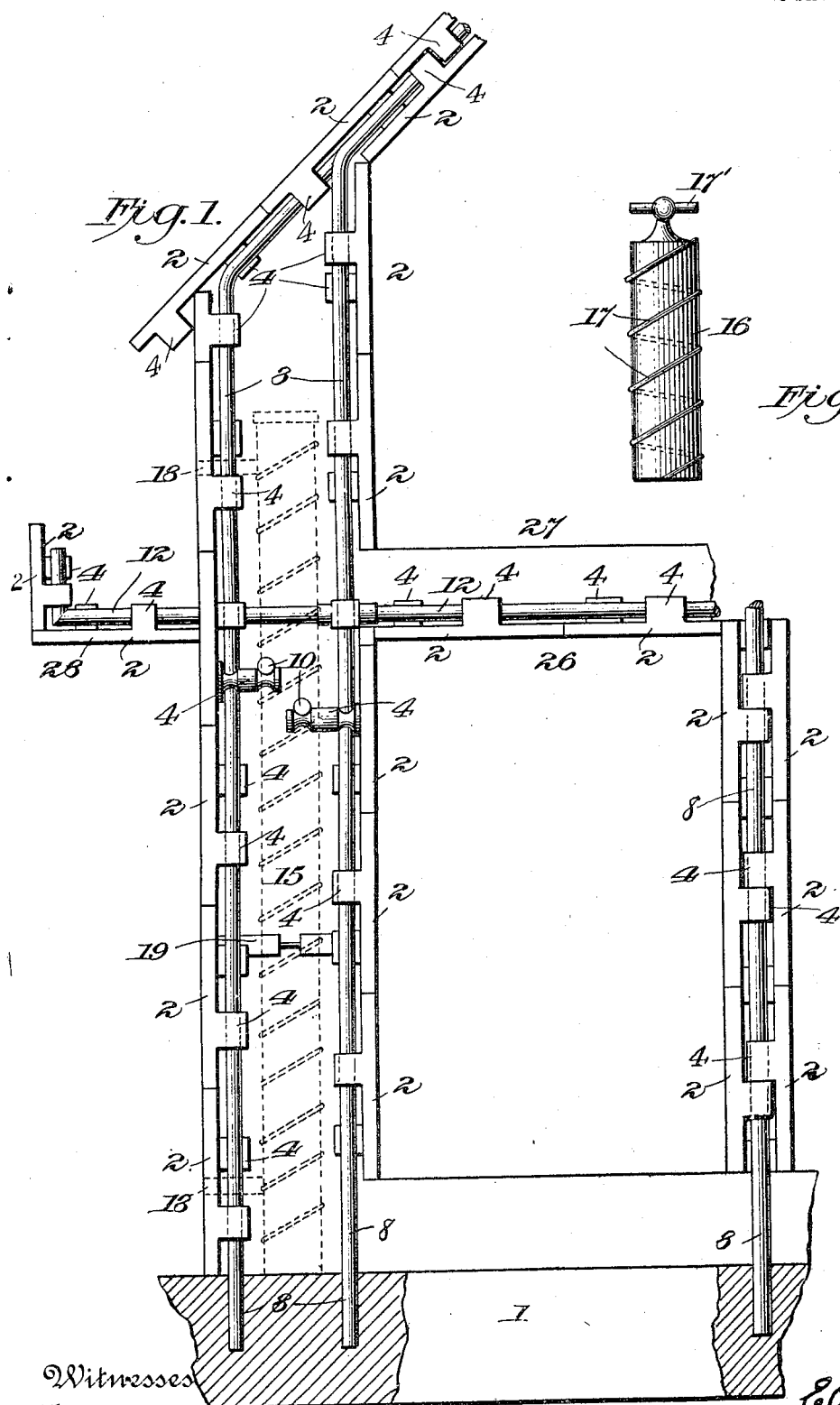

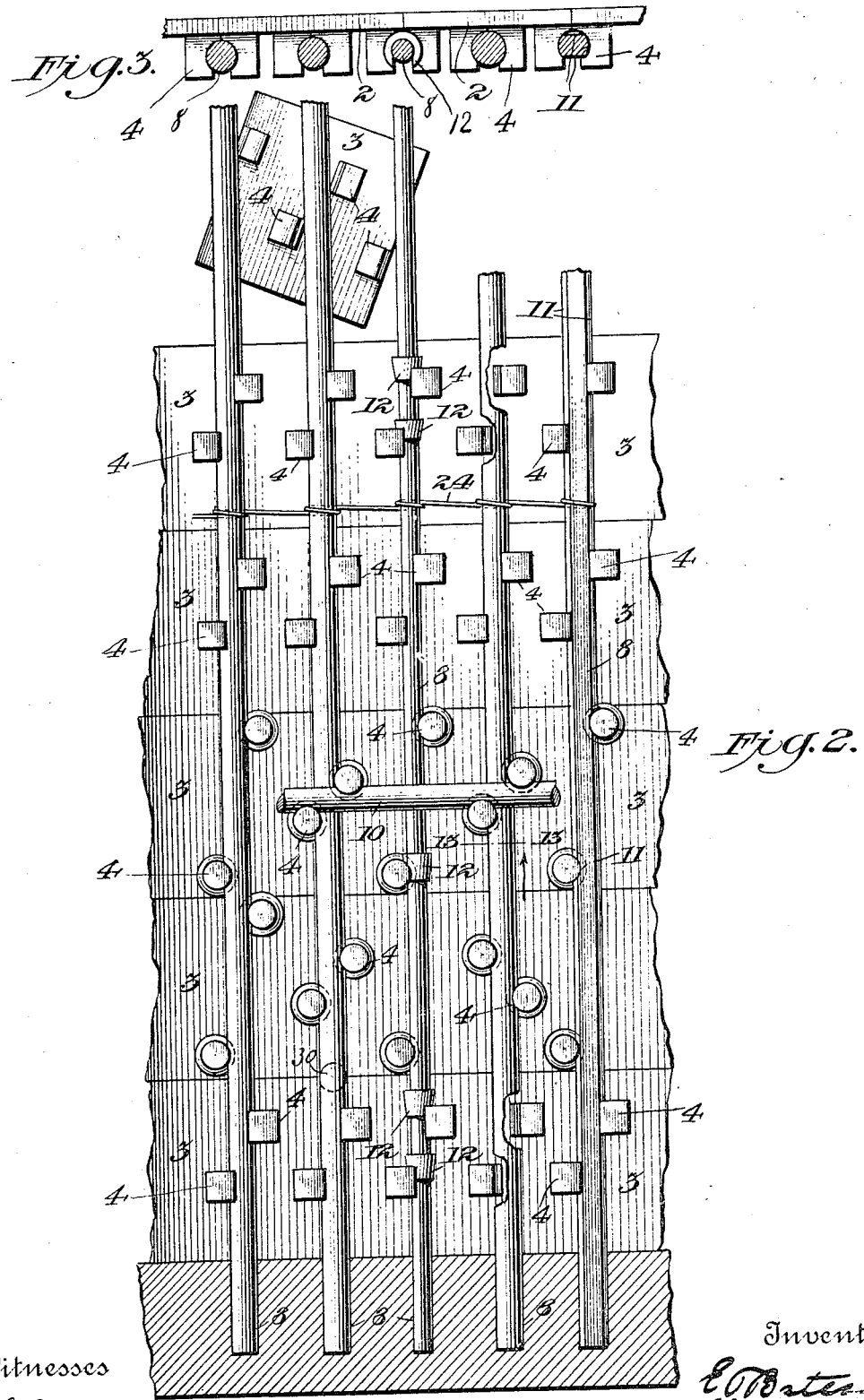

UNITED STATES PATENT OFFICE.

EDWARD T. BATES, OF WASHINGTON, DISTRICT OF COLUMBIA.

COMPOSITE CONSTRUCTION OF WALLS, PARTITIONS, AND THE LIKE.

1,052,788.  Specification of Letters Patent.  Patented Feb. 11, 1913.

Application filed April 6, 1910. Serial No. 553,786.

*To all whom it may concern:*

Be it known that I, EDWARD T. BATES, a citizen of the United States, residing at Washington, in the District of Columbia, have invented certain new and useful Improvements in Composite Construction of Walls, Partitions, and the Like; and I do hereby declare the following to be a full, clear, and exact description of the invention, such as will enable others skilled in the art to which it appertains to make and use the same.

My invention relates to the construction of walls, partitions, ceilings, floors, arches and roofs for buildings, and piers, cofferdams and the like, has for its object economy and facility in construction, durability and the ready handling of the material without skilled labor; and the invention consists in certain improvements which will be fully disclosed in the following specification and claims.

In the accompanying drawings, which form part of this specification:—Figure 1 represents a vertical transverse section of part of a building illustrating my invention. Fig. 2 is an elevation of a wall or partition with one side or face and the filling removed. Fig. 3 is a horizontal section of the same. Fig. 4 is a plan view of one of the building sections showing the inner side thereof. Fig. 5 is a horizontal section of the same on line 6—6 Fig. 4. Fig. 6 is a plan view of a modified form of the section. Fig. 7 is an end view of the same. Fig. 8 is a vertical transverse section of the lower part of a hollow wall. Fig. 9 is a detail plan view showing a detachable spacing and locking member applied to a rod. Fig. 10 is a perspective of the spacing and -locking member. Fig. 11 is a front elevation of a modified form of said member. Fig. 12 is a like view of another modification of said member. Fig. 13 is a horizontal section of a wall illustrating the modification shown in Fig. 2, on line 13—13 looking in the direction of the arrow. Fig. 14 is a plan view of a gage-plate on an enlarged scale. Fig. 15 is a longitudinal section of the same, and Fig. 16 is a side elevation of the core for forming the interior openings of a hollow wall shown in Figs. 1 and 8.

Reference being had to the drawings and the designating characters thereon, the numeral 1 indicates the base or foundation for a wall of a building, pier or the like.

2 indicates the interchangeable sections of which the building, wall, pier or the like is constructed. The form of the section is illustrated in Figs. 4, 5, 6, and 7, and comprises a body 3 on the inside of which are inwardly projecting members or lugs 4 arranged in pairs in different vertical and horizontal planes, which, when two sections are placed opposite each other, with the ends of the lugs abutting against the inner or adjacent interior faces become spacing members, to regulate the thickness of a wall or partition. These members 4 may be of any preferred form, square as shown in Figs. 4 and 5, or they may be cylindrical as shown in Figs. 6 and 7 and are provided with concave recesses 5 on one side in the former construction and continuous concavities 6, in the latter, and on both forms a shoulder 7 is formed at each end to provide a space between the inner face of the sections and the rigid metallic rods 8, to allow concrete to fill in behind the rod in concrete construction. In both forms of the lug, the outer shoulder is inside of the plane of the inner shoulder to allow for the passage of the reinforcing tie-rods 8 when the sections are being placed in position in a wall, as shown in Fig. 2. The members 4 may be strengthened by the use of metallic reinforces 9 extending into the body 3 and into the lug, as shown in Fig. 5. The tie-rods and reinforces 8 which engage the concave seats in the members 4 and secure the sections 2 against lateral displacement in the wall during construction are made in suitable lengths and in concrete construction some or all of them may be removed or withdrawn and the space occupied by said rods filled with cement, molten metal or the like which will take the place of the removed rods and forms an effective reinforce. The rods may be cylindrical and fit the concave seats in the members 4, or opposite sides thereof may be flattened as shown at 11, 11 in Figs. 2 and 3, so that they may be readily inserted between the members 4 and removed therefrom at the outer ends of said members. After the rod thus flattened has been inserted between the members 4, it is given a quarter turn on its axis, when the cylindrical portion of the rod engages the members 4 and securely locks the opposite or adjacent sections 2 together and holds them securely in position in the wall, as shown in Fig. 3. This rod may be further modified by using a smaller rod and applying tubular locking-keys or bushings 12, shown in the same figures of the drawings and in detail in Figs. 9, 10, 11 and 12. As shown, one side of the key is cut away at 13 so that they may be readily applied to the rod and pushed down between the rod and the members 4, as shown in Figs. 2 and 3 and effectively lock the rod in position and the sections 2 in the wall. The keys may be made with parallel sides as shown in Figs. 10 and 12 or they may be tapered slightly as shown in Fig. 11, or may be provided with a collar 14, as shown in Fig. 12. The keys may be rotated on the rod to bring the open side 13 on opposite sides thereof at intervals to prevent displacement of the rod in the lugs until the cement filling has been supplied.

The outer walls of buildings may be made hollow, as shown at 15, in Figs. 1 and 8, and this hollow construction is produced by the use of a cylindrical core 16, shown in Fig. 16, as many of them being used as may be required to expedite the work in forming as many conduits or passages 15 as may be desired. The core is provided with a screw-thread 17, is placed in position in the wall wherever a passage or conduit is desired for ventilating, conveying sewage, or water, running piping, electric wires or other purposes, cement poured in the wall between sections, 2, 2, filling the space between the body or sides 3, 3, and the core revolved and raised as the cement hardens by the bar 17' on the upper end thereof, thus forming cylindrical hollow spaces in the wall. When used for ventilating purposes exits to the passages may be made by forming openings 18 in the sections 2, as shown in Fig. 1. The thickness of the walls may be accurately regulated and the wall reinforced by the use of plates 19, shown in Figs. 1, 14 and 15, which are provided with openings 20, 20 to engage the members 4 and the projecting part of the rod 8, and openings 21, 21 to engage the tie rods 8, and the edges are concaved to fit around the wall of the passage of conduit 15. The plates are preferably made in two parts connected by right and left screw-threaded members 22, by which the plate may be adjusted to regulate the thickness of the wall.

The rods 8 may be secured together by wire 24 or horizontal tie-rods 10 may be laid on the lugs 4, as shown in Figs. 1 and 2. When the latter are used, the members 4 are lengthened as shown in Figs. 1 and 13.

In Fig. 1 a ceiling 26 and floor 27 composed of sections 2 and concrete are shown, and a balcony 28 is projected from the front of the wall, the inner sections 2 being omitted.

In the construction of walls the rods 8 are embedded in the base or foundation 1, properly spaced and the sections 2 assembled thereon. When a proper height of the wall has been reached, the space between the sections is filled with cement. Additional sections 2 are assembled and the filling with cement repeated as frequently as required until the walls are completed. The rods 8 may be allowed to remain in the walls at suitable intervals to form metallic reinforces for the walls, and the spaces left by the removal of a portion of the rods 8 may be filled with cement or other suitable material to form a reinforce for the wall, or the spaces may be left open to form dead air spaces in the walls.

In the construction of partitions, the sections 2 are placed in position on the rods 8 so that the outer ends of the members 4 rest against the inner side or face of the body 3, and the sections may be used interchangeably at will.

In the construction of portable wooden buildings, the rods 8 which secure the sections together and reinforce the structure may be allowed to remain in position; and may be made of steel, wood or other suitable material thus providing for a ready separation of the structure when it is desired to remove it.

In the construction of piers or coffer dams, where the foundation is below the surface of the water, the rods 8 having been properly spaced, the sections 2 may be applied to the rods as shown at the upper end of Fig. 2, squared thereon, two sections connected together on the rods to prevent lateral displacement in their descent, as by a key 30 engaging transverse openings 31 in the sections, as shown in Figs. 2 and 6, and allowed to gravitate to their position in the wall, or the sections may be assembled to form both faces of a wall, as shown at the lower right hand of said Fig. 2 and allowed to gravitate. After the wall has reached the surface of the water, the spaces between the sections are filled with cement as in the former construction, or in the construction of piers only one face of the wall may be erected and the space between the sides of the pier filled with stone and cement.

It is obvious that two opposite sections 2 may be assembled and the cement filling put in before the sections are placed on the rods, which cement after being immersed in water will soften and spread to seal the joints between the sections.

In some constructions it may be found desirable to reinforce the walls by using additional sections 2, between the outer faces of the wall, and form a binder of the cement to hold the additional section in position. To effect this, some of the sections may be perforated as shown at 29 in Fig. 6 to allow the cement to flow through the body of the sections and form binders.

Having thus fully described my invention, what I claim is—

1. A composite construction comprising rigid parallel supporting members, a plurality of sections set staggering having inwardly extending spacing and locking members arranged in different planes, the members in one plane having grooves facing in the same direction toward said supporting members, and the members in another plane having grooves facing in the opposite direction toward said supporting members, whereby the sections may be inserted between the supporting members and slide thereon.

2. A composite construction comprising rigid parallel supporting members or rods, a plurality of sections having inwardly extending spacing and locking members arranged in different vertical and different horizontal planes and having grooves in their adjacent faces opening toward said supporting members to engage both opposite sides of each supporting member and slide thereon.

3. A composite construction comprising rigid parallel supporting members or rods, a plurality of sections having inwardly extending spacing and locking members arranged in different vertical and different horizontal planes and having grooves in their adjacent faces opening toward said supporting members to engage both opposite sides of each supporting member and slide thereon, and a member engaging the abutting edges of said section for securing the sections against lateral displacement while sliding on the supporting members.

4. A composite construction comprising rigid supporting members embedded at their lower ends, a plurality of sections having laterally extending spacing and locking members set staggering and constructed to engage said supporting members on opposite sides and slide thereon.

5. A wall or partition comprising sections provided with projecting members on one side thereof set staggering in different planes and having concave sides facing each other, reinforcing members between and engaging the aforesaid members, and detachable locking members for securing said reinforcing members to said sections.

6. A wall or partition comprising sections provided with projecting spacing and locking members on one side thereof set staggering and provided with grooves in their adjacent faces, reinforcing members between and engaged on both or opposite sides by the aforesaid members, and means for connecting the reinforcing members together.

7. A wall or partition comprising sections provided with members on the inner side thereof set staggering and having concave sides facing each other and shoulders at each end of the concave, reinforcing members between and engaging the aforesaid members, and a filling of concrete between said sections and around said reinforcing members.

8. A wall or partition comprising sections provided with members on the inner side thereof set staggering and spaced apart, reinforcing members between the aforesaid members, and locking members on the reinforcing members, said locking members having an open side for securing them to the sections.

9. A wall comprising slidable sections provided with members on the inner side thereof set staggering and having concave sides constructed to engage opposite sides of reinforcing members and prevent lateral displacement of the sections, reinforcing members between and engaging the concave sides of adjacent members, a filling of concrete and conduits in the wall formed by the concrete.

10. A wall comprising opposite sections having laterally projecting members on their inner faces set staggering provided with concave sides, reinforcing members engaging opposite sides of said projecting members, and horizontally arranged reinforcing plates between said sections and connected to said reinforcing members.

11. A section for a wall or the like having projections on one face thereof set staggering in different vertical and horizontal planes, said projections provided with concave sides facing each other and adapted to engage a rod for connecting the sections of the rod.

12. A section for a wall or the like, having projections on one side thereof set staggering in different vertical and horizontal planes provided with concave sides facing each other and adapted to engage a rod, and having transverse openings through the body of the section.

In testimony whereof I affix my signature, in presence of two witnesses.

EDWARD T. BATES.

Witnesses:
D. C. REINOHL,
W. PARKER REINOHL.